UNITED STATES PATENT OFFICE.

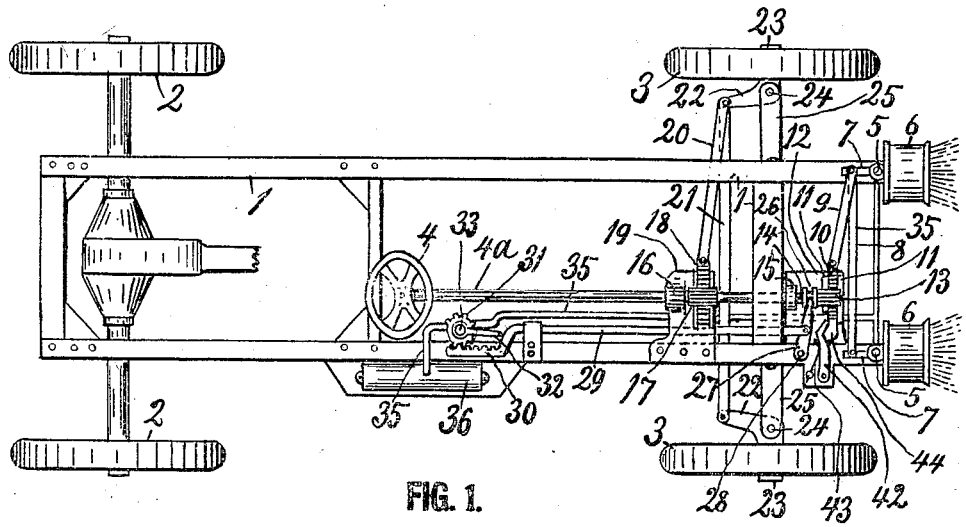

JOHN E. BJORLIE, OF PEKIN, NORTH DAKOTA.

AUTOMOBILE HEADLIGHT-TURNER.

1,100,946.   Specification of Letters Patent.   Patented June 23, 1914.

Application filed June 30, 1913. Serial No. 776,566.

*To all whom it may concern:*

Be it known that I, JOHN E. BJORLIE, a citizen of the United States, residing at Pekin, in the county of Nelson and State of North Dakota, have invented a new and useful Automobile Headlight-Turner, of which the following is a specification.

This invention relates to combined lighting and turning devices for head-lights of automobiles and other vehicles; and the main object is to provide an efficient device of said kind.

In the accompanying drawing,—Figure 1 is a plan view of the wheels and so much of the frame work and other parts of an automobile as is required in showing and describing my invention applied thereto. Fig. 2 is an enlarged detail view of a gas pipe and gas valve with some of my invention attached thereto for opening and closing the valve when gas is used for the head-lights. Fig. 3 is a detail view showing the lighting and extinguishing means when electric lights are used in the head-lights. Fig. 4 is an enlarged portion near the right hand end of the view Fig. 1.

Referring to the drawing by reference numerals, 1 designates the frame, 2 the driving wheels, 3 the steered front wheels and 4 the steering wheel of any automobile or auto truck capable of having this invention applied to it.

The frame shown may for convenience of description be termed the body or truck of the vehicle. Upon the front end of the truck are mounted to turn either on or with vertical posts 5 two head-lights 6, each of which has a rocker arm 7. Said arms are pivotally connected by a rod 8. One end of said rod is connected by a link 9 with a rack 10, which slides between guiding ribs 11 of a bracket 12. Said rack is arranged for engagement by a cog pinion 13, which is slidable on the lower end of the steering shaft 4ª and on a key 14 fixed therein. Said shaft is journaled in bearings 15 and 16 and has the steering wheel 4 fixed on its upper end. On said shaft 4ª is fixed a pinion 17 meshing with a rack 18, which is slidable in a bracket 19 and connected by a link 20 with a rod 21, which pivotally connects the rocker arms 22 of the skeins 23, which are pivoted at 24 to the front axle or supporting arms 25.

Turning again to the slidable pinion 13, it will be seen that it has a peripheral groove 26, engaged by a shifter 27, which is pivoted at 28 to the frame and is operated by a rod 29, which near its rear end has a rack 30 engaged by a mutilated cog-wheel 31, which wheel is connected with a handle 32 and a valve plug 33 of a valve 34, (best shown in Fig. 2). Said valve is inserted in a pipe line 35 extending from a gas reservoir 36 to the gas jets in the head-lights. If electric lights are used, as indicated in Fig. 3, the electric wiring 37 takes the place of the gas pipes 35 and an electric battery (not shown) takes the place of the gas-holder 36; and a switch 38 is so arranged that the switch plug 39 may be turned by the handle 32. One of the many ways in which this may be done is shown in Fig. 3, where a bracket 40 is secured to the frame 1 and to the switch 38, and in it is journaled a fork 41 having the gear 31 and the handle 32 secured on it.

In Fig. 1 is shown a pivoted arm 42, pressed by a spring 43 and having a V-shaped notch fitting a V-shaped lug 44 on the rack 10.

The operation of the device is as follows: Whether electric or gas lights are used makes no difference. The front wheels are steered by the hand wheel 4, shaft 4ª, pinion 17, rack 18, link 20 and rod 21, while the head-lights after being lighted are turned in unison with the front wheels 3, by the rod 8, link 9, rack 10, pinion 13 and shaft 4ª, the spring 43 yielding for the movement of the lug 44 of the rack 10. When the lights are not needed, as during the day time, the handle 32 is turned rearwardly, and by so doing the gear 31, acting on the rack 30, rod 29 and shifter 27 moves the pinion 13 rearwardly out of mesh with the rack 10, and the spring 43 by acting on the arm 42 causes the rack 10 to slide to a position in which it holds the head-lights in a straight forward direction. The rack 10 is thereby also held in proper position for reëngagement by the pinion 13 whenever the latter is moved forward by turning the lights on while the front wheels are standing in a fairly straight forward direction. It will thus be seen that by a single forward movement of the handle 32 the lights will be turned on and also automatically coupled to the steering mechanism; and by a single rearward movement of the same handle the lights are put out and are also automatically uncoupled from the steering mechanism, thus preventing wear and tear of the head-light turning mechanism during the day time when no artificial lights are used, and also saving the manual labor required to operate said head-light turning mechanism when it is idle.

What is claimed as new, and desired to be protected, is:

1. In a vehicle, the combination with a vehicle body, of supporting wheels arranged to be turned laterally in steering the vehicle, one or more head-lights mounted on the vehicle and arranged to turn from side to side in unison with the steered wheels, a manually operated steering mechanism operatively connected with the steered wheels, a source of light connected with the head-lights, a head-light turning mechanism, means for coupling the head-light turning mechanism to and uncoupling it from the steering mechanism, means for lighting and extinguishing the head lights, said coupling and uncoupling means and said means for lighting and extinguishing the head-lights being operatively connected so as to act simultaneously.

2. In a vehicle, the combination with a vehicle body, of supporting wheels arranged to be turned laterally in steering the vehicle, one or more head-lights mounted on the vehicle and arranged to turn from side to side in unison with the steered wheels, a source of light connected with the head-lights, a head-light turning mechanism, a manually operated steering mechanism operatively connected with the steered wheels, means for coupling the last mentioned two mechanisms together and for uncoupling them; means for lighting and extinguishing the head-lights, said coupling and uncoupling means and said means for lighting and extinguishing the head-lights being operatively connected so as to act simultaneously; and automatic means for holding the head-lights in a forward direction when they are uncoupled from the steering mechanism.

In testimony whereof I affix my signature in presence of two witnesses.

JOHN E. BJORLIE.

Witnesses:
E. C. BREKKER,
H. G. SCANSEN.